United States Patent
Banno

(10) Patent No.: US 9,706,331 B2
(45) Date of Patent: Jul. 11, 2017

(54) NON-TRANSITORY COMPUTER-READABLE STORAGE MEDIUM STORING INFORMATION PROCESSING PROGRAM FOR INFORMATION PROCESSING DEVICE, INFORMATION PROCESSING DEVICE, AND METHOD FOR CONTROLLING INFORMATION PROCESSING DEVICE

(71) Applicant: BROTHER KOGYO KABUSHIKI KAISHA, Nagoya, Aichi (JP)

(72) Inventor: Katsura Banno, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 139 days.

(21) Appl. No.: 14/582,494

(22) Filed: Dec. 24, 2014

(65) Prior Publication Data
US 2015/0189489 A1  Jul. 2, 2015

(30) Foreign Application Priority Data

Dec. 27, 2013 (JP) .................. 2013-272381

(51) Int. Cl.
H04W 8/00 (2009.01)
H04W 4/00 (2009.01)
H04W 84/12 (2009.01)

(52) U.S. Cl.
CPC .............. *H04W 4/00* (2013.01); *H04W 84/12* (2013.01)

(58) Field of Classification Search
CPC .................................................. H04W 8/005
See application file for complete search history.

(56) References Cited

U.S. PATENT DOCUMENTS 7,760,745 B2 * 7/2010 Qureshi .................. H04L 45/04
370/315
8,165,102 B1 * 4/2012 Vleugels ............... H04W 88/08
370/338

(Continued)

FOREIGN PATENT DOCUMENTS

JP 2012-175614 A 9/2012
JP 2013-210780 A 10/2013

*Primary Examiner* — Parth Patel
(74) *Attorney, Agent, or Firm* — Scully, Scott, Murphy & Presser, PC

(57) ABSTRACT

An information processing device may perform enabling a communication between a first network and the information processing device in a case that a setting to enable the communication between the first network and the information processing device is not being made. The information processing device may perform receiving, from the communication device, communication device information. The information processing device may perform receiving an acquisition order to acquire external device information stored in an external device. The information processing device may perform enabling a communication between a second network and the information processing device when the acquisition order is received. The information processing device may perform receiving, from the external device, external device information. The information processing device may perform acquiring usage data to be used in the communication device by using the communication device information and the external device information.

23 Claims, 8 Drawing Sheets

(56) References Cited

U.S. PATENT DOCUMENTS

| | | | | |
|---|---|---|---|---|
| 8,966,018 B2* | 2/2015 | Bugwadia | G06F 9/4411 | 709/220 |
| 9,036,175 B2* | 5/2015 | Sugiyama | G03G 15/5091 | 358/1.14 |
| 2005/0278646 A1* | 12/2005 | Liscano | H04L 29/06 | 715/762 |
| 2006/0227358 A1* | 10/2006 | Brunninger | G06F 3/1204 | 358/1.14 |
| 2006/0251256 A1* | 11/2006 | Asokan | H04L 63/065 | 380/270 |
| 2007/0025246 A1* | 2/2007 | Pirzada | H04W 84/02 | 370/230 |
| 2011/0032567 A1* | 2/2011 | Ishida | G06F 21/56 | 358/1.15 |
| 2011/0191392 A1* | 8/2011 | Kameda | G07C 5/008 | 707/812 |
| 2011/0289186 A1* | 11/2011 | Bell | B60R 25/00 | 709/217 |
| 2012/0218918 A1* | 8/2012 | Takae | H04W 8/005 | 370/255 |
| 2013/0028152 A1* | 1/2013 | Kim | H04W 88/08 | 370/310 |
| 2013/0073720 A1* | 3/2013 | Min | H04W 4/02 | 709/224 |
| 2013/0081146 A1* | 3/2013 | Hakozaki | H04N 1/00222 | 726/28 |
| 2013/0141747 A1* | 6/2013 | Oba | G06F 3/1292 | 358/1.14 |
| 2013/0166785 A1* | 6/2013 | Lee | H04L 67/125 | 710/11 |
| 2013/0188212 A1* | 7/2013 | Pardhan | H04N 1/00222 | 358/1.14 |
| 2013/0258403 A1* | 10/2013 | Kawai | G06K 15/005 | 358/1.15 |
| 2014/0092418 A1* | 4/2014 | Kishimoto | H04N 1/00896 | 358/1.14 |
| 2014/0146345 A1* | 5/2014 | Fujisawa | G06F 3/1229 | 358/1.14 |
| 2014/0228042 A1* | 8/2014 | Annan | H04W 8/26 | 455/452.1 |
| 2014/0355029 A1* | 12/2014 | Mccoog | G06K 15/4095 | 358/1.14 |
| 2015/0052235 A1* | 2/2015 | Tokunaga | H04L 67/16 | 709/223 |
| 2015/0124278 A1* | 5/2015 | Juchem | G06Q 20/40 | 358/1.14 |
| 2015/0189489 A1* | 7/2015 | Banno | H04W 4/00 | 370/328 |
| 2016/0210578 A1* | 7/2016 | Raleigh | G06Q 10/06375 | |

* cited by examiner

NON-TRANSITORY COMPUTER-READABLE STORAGE MEDIUM STORING INFORMATION PROCESSING PROGRAM FOR INFORMATION PROCESSING DEVICE, INFORMATION PROCESSING DEVICE, AND METHOD FOR CONTROLLING INFORMATION PROCESSING DEVICE

CROSS-REFERENCE TO RELATED APPLICATION

This application claims priority to Japanese Patent Application No. 2013-272381, filed on Dec. 27, 2013, the contents of which are hereby incorporated by reference into the present application.

TECHNICAL FIELD

The technique disclosed herein relates to an information processing program for communicating with a communication device.

DESCRIPTION OF RELATED ART

A mobile terminal device capable of performing a communication with a wireless communication device is known. The mobile terminal device executes a search process to find a wireless communication device in the vicinity in response to an application being started. Further, a display screen is generated that includes an image indicating the wireless communication device that was found, and the selection of the wireless communication device is received. Then, a wireless communication is performed with the selected wireless communication device.

SUMMARY

The present specification discloses a technique that allows an information processing device to appropriately perform a wireless communication of target data with a communication device.

One technique disclosed in the present application is a non-transitory computer-readable storage medium storing information processing program, which is to be read and executed in an information processing device. The information processing device may comprise a communication interface configured to perform communication with various networks; and a processor coupled to the communication interface. The information processing program, when executed by the processor, may cause the information processing device to perform (a) enabling a communication between a first network and the information processing device in a case that a setting to enable the communication between the first network and the information processing device is not being made. The first network may be configured to mediate a communication with a communication device. The information processing program may cause the information processing device to perform (b) receiving, from the communication device via the first network and the communication interface, communication device information related to the communication device after having enabled the communication between the first network and the information processing device. The information processing program may cause the information processing device to perform (c) receiving an acquisition order to acquire external device information stored in an external device when the communication between the first network and the information processing device is enabled. The information processing program may cause the information processing device to perform (d) enabling a communication between a second network and the information processing device when the acquisition order is received in the process of (c) in the case that the communication between the first network and the information processing device has been enabled. The second network may be configured to mediate a communication with the external device. The information processing program may cause the information processing device to perform (e) receiving, from the external device via the second network and the communication interface, external device information stored in the external device after having enabled the communication between the second network and the information processing device. The information processing program may cause the information processing device to perform (f) acquiring usage data to be used in the communication device by using the communication device information and the external device information, when the communication device information is received in the process of (b) and the external device information is received in the process of (e).

BRIEF DESCRIPTION OF THE DRAWINGS

EMBODIMENT (Structure of Communication System 10)
FIG. 1 is a block view showing the structure of a communication system 10. The communication system 10 comprises an information processing device 100 and MFP 51. Here, MFP indicates a multifunction peripheral device (also called Multifunction Peripheral) comprising a print function, scan function, and copy function.

Figure 1:
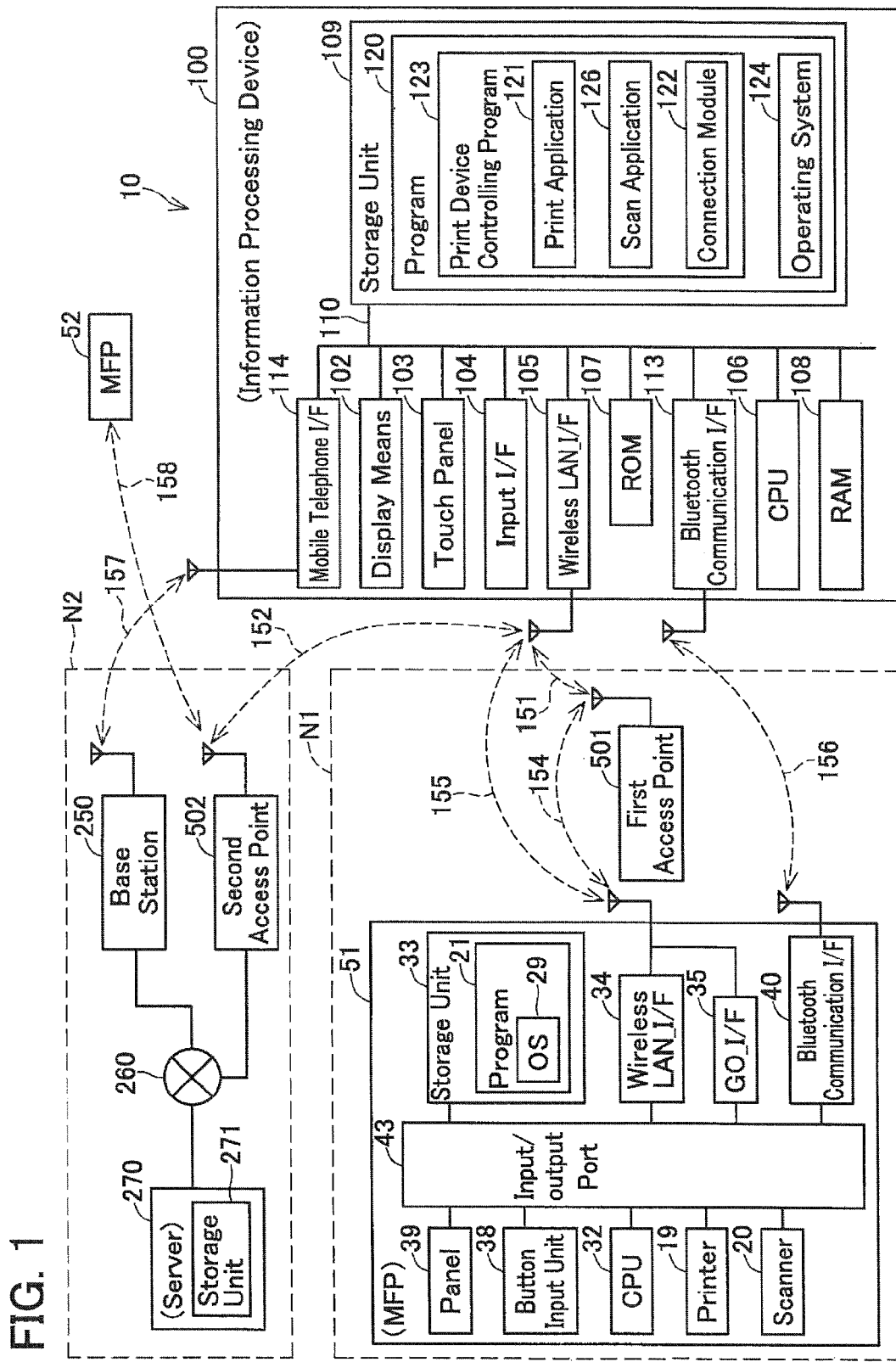
FIG. 1 shows the structure of a communication system.

When the MFP 51 itself is functioning as a wireless LAN access point, the MFP 51 itself can be said to be belonging to a first network N1 as a wireless LAN access point. The first network N1 is a term for conveniently referring to a network capable of communicating with the MFP 51. Further, the MFP 51 can also belong as a wireless LAN station to the first network N1 to which a first access point 501 is belonging as a wireless LAN access point. The wireless LAN access point is a device that mediates communication with a wireless LAN station belonging to a network to which the wireless LAN access point is belonging. Further, the wireless LAN access point is also a device that makes a connection with a network other than the network to which the wireless LAN access point is belonging, and that mediates communication between the wireless LAN station belonging to the network to which the wireless LAN access point is belonging, and a device belonging to the network with which the connection was made. The information processing device 100 can communicate with the MFP 51 via the mediation of the first network N1 by belonging as a wireless LAN station to the first network N1. The concept of being able to communicate with the MFP 51 via the mediation of the first network Ni encompasses being able to communicate with the MFP 51 via any communication path or device of the first network N1. The communication path may be wired or wireless.

A second access point 502 and a base station 250 can communicate with a server 270 via the mediation of an Internet 260. The concept of being able to communicate with the server 270 via the mediation of the Internet 260 encompasses being able to communicate with the server 270 via any communication path or device of the Internet 260. The server 270 may be a device on the Internet 260. The server 270 may belong to another network connected with the Internet 260. The second access point 502 may belong, as a wireless LAN access point, to a network connected with the Internet. The concept of being connected with the Internet encompasses a state of being capable of communication with the Internet. That is, it may be capable of communication with the Internet via any device. By belonging as a wireless LAN station to a network to which the second access point 502 is belonging, the information processing device 100 can communicate with the server 270 via the mediation of the second access point 502 and the Internet 260. For convenience, a broad concept of network, which includes the Internet 260 that mediates communication with the server 270, the second access point 502, and the server 270, is termed a second network N2.

Further, an MFP 52 also belongs to a network to which the second access point 502 belongs. That is, the information processing device 100 can communicate with the MFP 52 via the mediation of the second access point 502. Moreover, the structure of the MFP 52 may be the same as the structure of the MFP 51, to be described.

The server 270 comprises a storage unit 271. A plurality of template image data is stored in the storage unit 271. The template image data is data used when acquiring print data for causing the MFP 51 to execute a print process. The template image data may be stored in advance in the storage unit 271 by a vendor or the like of the MFP 51.

Moreover, the first network N1 is not connected with the Internet 260. Consequently, the information processing device 100 cannot communicate with the server 270 despite belonging to the first network N1.

Moreover, in the description below, "the information processing device 100 belongs, as a wireless LAN station, to the first network N1" may also be described as "the information processing device 100 is connected with the first network N1", "the information processing device 100 is connected with the first access point 501" or "the information processing device 100 is connected with the MFP 51". Similarly, "the information processing device 100 belongs, as a wireless LAN station, to the network to which the second access point 502 belongs" may also be described as "connected with the second network N2", "connected with the second access point 502" or "connected with the server 270".

(Structure of Information Processing Device 100)

The information processing device 100 is a portable device such as a mobile phone or a portable terminal device. The information processing device 100 comprises a display means 102, a touch panel 103, an input I/F 104, the wireless LAN_I/F 105, the bluetooth communication I/F 113, mobile telephone_I/F 114, a CPU (referred to as Central Processing Unit) 106, a ROM (referred to as Read Only Memory) 107, a RAM (referred to as Random Access Memory) 108, a storage unit 109, etc., which are connected with one another via an input/output port 110. Here, "I/F" is an abbreviation of "Interface".

The display means 102 receives an image signal output from the CPU 106, and displays an image based on the received image signal. An LCD (referred to as Liquid Crystal Display), an organic EL (referred to as Organic Electro-Luminescence) panel, etc. may be used as the display means 102. The touch panel 103 is formed of a transparent member, and is disposed so as to cover a surface of the display means 102. The touch panel 103 detects a position touched by the finger or the like of the user, and outputs detected position information to the CPU 106. The input I/F 104 is, e.g., an operation button.

The wireless LAN_I/F 105 is an I/F that performs communication as a wireless LAN station. The wireless LAN_I/F 105 performs communication based on Wi-Fi (registered trademark of Wi-Fi Alliance) infrastructure mode or communication based on Wi-Fi Direct. In the present specification, the wireless LAN_I/F 105 that performs communication based on Wi-Fi infrastructure mode is also referred to as the WF_I/F. Further, the wireless LAN_I/F 105 that performs communication based on Wi-Fi Direct is also referred to as the WFD_I/F. The wireless LAN_I/F performs communication based on the standard of 802.11 of IEEE (also called The Institute of Electrical and Electronics Engineers, Inc.), and a standard (e.g., 802.11a, 11b, 11g, 11n, etc.) equivalent to this standard. A communication path used by the WF_I/F and formed with the first access point 501 is herein termed a wireless communication 151. A communication path used by the WF_IF and formed with the second access point 502 is herein termed, for convenience, a wireless communication 152. A communication path used by the WFD_I/F and formed with the MFP 51 is herein termed, for convenience, a wireless communication 155.

The bluetooth (registered trademark of Bluetooth SIG, Inc. Same below.) communication I/F 113 can use a communication path (herein termed, for convenience, a wireless communication 156) formed between the MFP 51 and the information processing device 100 by performing a communication based on the bluetooth scheme. The mobile telephone IF 114 can use a communication path (herein termed, for convenience, a wireless communication 157) formed between the second network N2 and the information processing device 100 by performing a communication based on a communication standard for mobile telephones. Examples of the communication standard for mobile telephones are the standard of third generation (also called 3G), and the standard of LTE (also called Long Term Evolution) (registered trademark of European Telecommunications Standards (ETSI)).

The CPU 106 executes programs stored in the storage unit 109. The RAM 108 temporarily stores information needed for the processes of the CPU 106. The storage unit 109 is configured such that a flash memory, HDD (referred to as Hard Disk Drive), and a buffer or the like provided in the CPU 106, are combined. Image data, document data, etc. can be stored in the storage unit 109.

Further, the storage unit 109 stores a program 120. The program 120 includes a print device controlling program 123, and an operating system 124 (referred to as OS 124 below). The print device controlling program 123 includes a print application 121, a scan application 126, and a connection module 122. The CPU 106 executes processes in accordance with the program 120. The storage unit 109 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

Hereafter, the CPU 106 executing a program such as the print application 121, the connection module 122, the OS 124, etc. may be described simply by the program name. For example, the description "the print application 121" may mean "the CPU 106 that executes the print application 121".

The print device controlling program 123 is a program for controlling various print devices such as the MFP 51. The print application 121 is an application for causing the information processing device 100: to acquire printer information indicating characteristics and status as a printer from the MFP 51, etc.; to acquire template image data indicating a template image from the server 270, etc.; to generate, based on the printer information and the template image data, screen information of an editing screen, the editing screen being to perform an edit on the template image, said edit being compatible with the device which is an acquisition source of the printer information; to display the editing screen; to accept a user operation to edit the template image; to generate print data for printing the edited template image; to send to the MFP 51, etc. the print data compatible with the MFP 51, etc.; and to cause the MFP 51, etc. to execute a print process.

The scan application 126 is an application for causing the information processing device 100: to acquire scanner information indicating characteristics and status as a scanner from the MFP 51, etc.; to acquire template image data indicating a template image from the server 270, etc.; to generate, based on the scanner information and the template image data, screen information of an editing screen, the editing screen being to perform an edit, on the template image in which the image obtained by scanning is synthesized; to display the editing screen; to accept a user operation instructing a scan; to send to the MFP 51, etc., a scan executing instruction compatible with the MFP 51, etc.; to receive scan data from the MFP 51, etc.; and to synthesize an image indicating the scan data in the template image.

Moreover, in the present embodiment, the case will be described in which the connection module uses the print application 121 to connect the information processing device 100 with the second network N2 when the template image data is required, and to connect the information processing device 100 with the first network N1 when sending of the print data is required. Moreover, as with the print application 121, the scan application 126 also uses the connection module to connect the information processing device 100 with the second network N2 when the template image data is required, and to connect the information processing device 100 with the first network N1 when sending of the scan executing instruction is required.

Further, a second print application or second scan application, not shown, may be stored by the storage unit 109. In the second print application, the method of using the connection module may be in common with that of the print application 121. In the second print application, the acquisition source of the template image data may be different from that of the print application 121. In the second print application, edit contents for the template image may be different from those of the print application 121. In the second print application, contents of the print data to be generated may be different from those of the print application 121. In the second scan application, the method of using the connection module may be in common with that of the scan application 126. In the second scan application, the acquisition source of the template image data may be different from that of the scan application 126. In the second print application, edit contents for the template image may be different from those of the scan application 126.

The connection module 122 is a program that executes a process to connect the information processing device 100 with various networks via a wireless communication. The connection module 122 may be a program that is called and executed in various applications such as the print application 121 and the print application 121, or the like. That is, the connection module 122 may function as a lower-level application that provides a communication function to a higher-level application (e.g., the print application 121 and the scan application 126) that provides a function close to the user.

The OS 124 is a program that provides a basic function of which use is shared by the connection module 120 and the print application 121, etc. In the present embodiment, a case is described in which the OS 124 is an Android (registered trademark of Google Inc.) OS. The OS 124 includes a program for causing the wireless LAN_I/F 105, the mobile phone I/F 114, and the bluetooth communication I/F 113 to perform a wireless communication. Further, the OS 124 is also a program that provides an API (referred to as Application Programming Interface) for each program to acquire information acquired by hardware, or for each program to instruct various hardware. The connection module 120, the print application 121, etc. output various instructions to the OS 124 using the API provided by the OS 124. That is, the connection module 120, the print application 121, etc. give instructions to the units of the information processing device 100 via the OS 124. Results from the instructions are output from the OS 124 to the connection module 120, the print application 121, etc.

(Structure of MFP 51)

The structure of the MFP 51 will be described. The MFP 51 mainly comprises a CPU 32, a storage unit 33, the wireless LAN_I/F 34, a GO_I/F 35, the NFC I/F 36, the bluetooth communication I/F 40, a button input unit 38, a panel 39, a printer 19, and a scanner 20. These structural elements are capable of communicating with one another via an input/output port 43.

The CPU 32 executes a program 21 stored in the storage unit 33. The storage unit 33 is configured such that a RAM, ROM, flash memory, HDD (referred to as Hard Disk Drive), and a buffer or the like provided in a CPU 32 are combined. As with the storage unit 109, the storage unit 33 may be a computer readable storage medium. The storage unit 33 stores the program 21. The program 21 includes an OS 29, etc.

The wireless LAN_I/F 34 is an I/F for performing a communication as a wireless LAN station. The wireless LAN_IF 34 performs a communication based on Wi-Fi infrastructure mode. A communication path formed with the first access point 501 by the wireless LAN_I/F 34 is herein termed, for convenience, a wireless communication 154. Moreover, the wireless LAN_I/F 34 can also form a communication path with the second access point 502 if appropriate settings are performed. The GO_I/F 35 is an I/F for performing a communication as a wireless LAN access point. The GO_I/F 35 performs communication based on the WFD scheme. A communication path formed with the information processing device 100 by the GO_I/F is herein termed, for convenience, a wireless communication 155. The state of the wireless communication 155 being formed by the GO I/F can also be said to be the MFP 51 operating in Group Owner state. The Group Owner state device can establish a connection with another device operating as a wireless LAN station, and cause the other device to newly belong as a wireless LAN station to the network to which the Group Owner state device belongs. The state of the wireless communication 155 being formed can also be said to be information that the information processing device 100 is belonging to the first network N1. By performing a communication based on the bluetooth scheme, the bluetooth communication I/F 40 may use the wireless communication 156 formed with the information processing device 100.

The button input unit 38 is a key to perform the functions of the MFP 51. The button input unit 38 may be configured integrally with the panel 39 as a touch panel. The panel 39 displays various function information of the MFP 51. The printer 19 is a member that executes a print process using image data stored in the storage unit 33. The scanner 20 is a member that executes a scan process of reading a document.

(Structure of MFP 52)

The MFP 52 has the same structure as the MFP 51. Moreover, a communication path is formed between the MFP 52 and the second access point 502. For convenience, the communication path formed between the MFP 52 and the second access point 502 is designated a wireless communication 158.

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information. However, it should be noted that the aforementioned distinction of "data" and "information" is not limited to the above definition, and other definitions are also within the scope of teachings disclosed herein.

(Operation of Communication System)

The operation of the communication system 10 will be described using the sequence views of FIG. 2 to FIG. 6. Moreover, in the sequence views of FIG. 2 to FIG. 6, a dotted frame indicating the range of the information processing device 100 is described. Processes executed by the print application 121 and the connection module 122 are described within the dotted frame. The arrow from the vertical line indicating the process of the print application 121 and the vertical line indicating the process of the connection module 122 to the frame indicating the range of the information processing device 100 indicates that instruction information is outputted from the print application 121 and the connection module 122 to the OS 124. The arrow from the frame indicating the range of the information processing device 100 to the vertical line indicating the process of the print application 121 and the vertical line indicating the process of the connection module 122 indicates that response information is outputted from the OS 124 to the print application 121 and the connection module 122. The arrow from the frame indicating the range of the information processing device 100 toward the outside of the frame indicates that various types of information are sent, under the control of the OS 124, to a device external to the information processing device 100 from the various communication interfaces of the information processing device 100. The arrow from the outside of the frame toward the frame indicating the range of the information processing device 100 indicates that various types of information, sent to the information processing device 100 from a device external to the information processing device 100, is received by the information processing device 100. The various types of information sent to the information processing device 100 are received by the various communication interfaces, and acquired by the OS 124 via the various communication interfaces. The OS 124 outputs the various types of information, as needed, to the print application 121 and the connection module 122.

Figure 2:
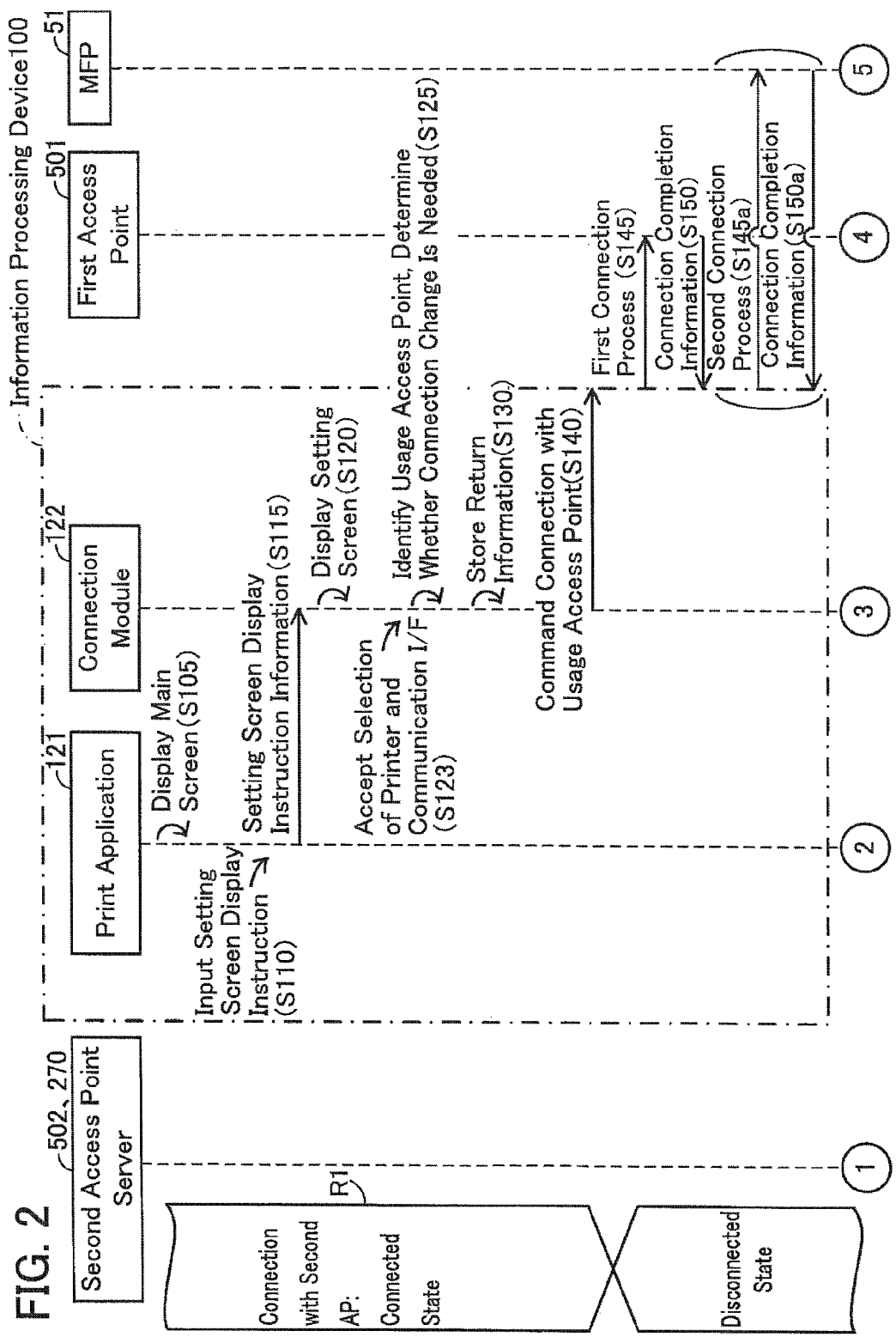
FIG. 2 shows an operation sequence view of the communication system.
Figure 3:
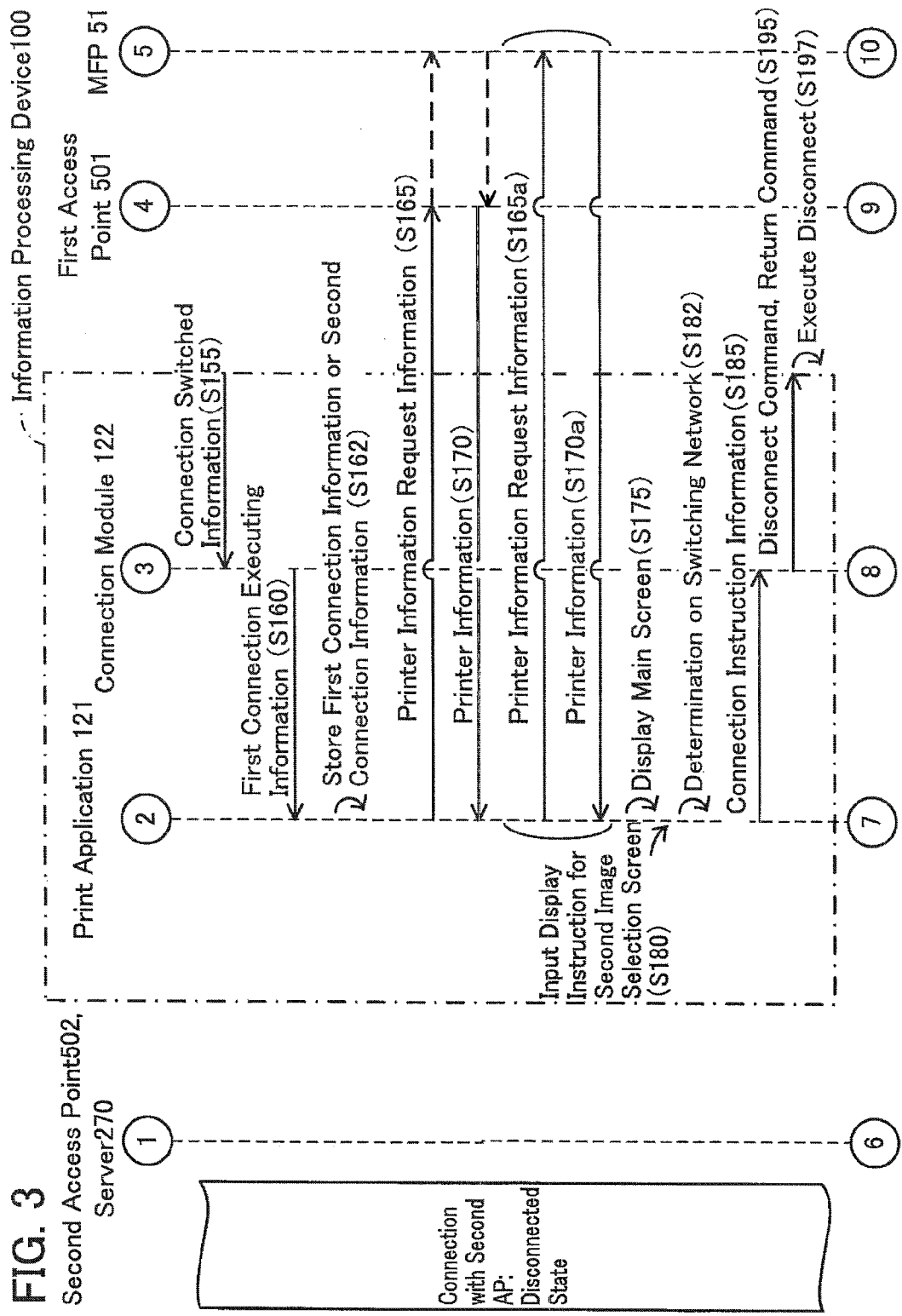
FIG. 3 shows an operation sequence view of the communication system.
Figure 4:
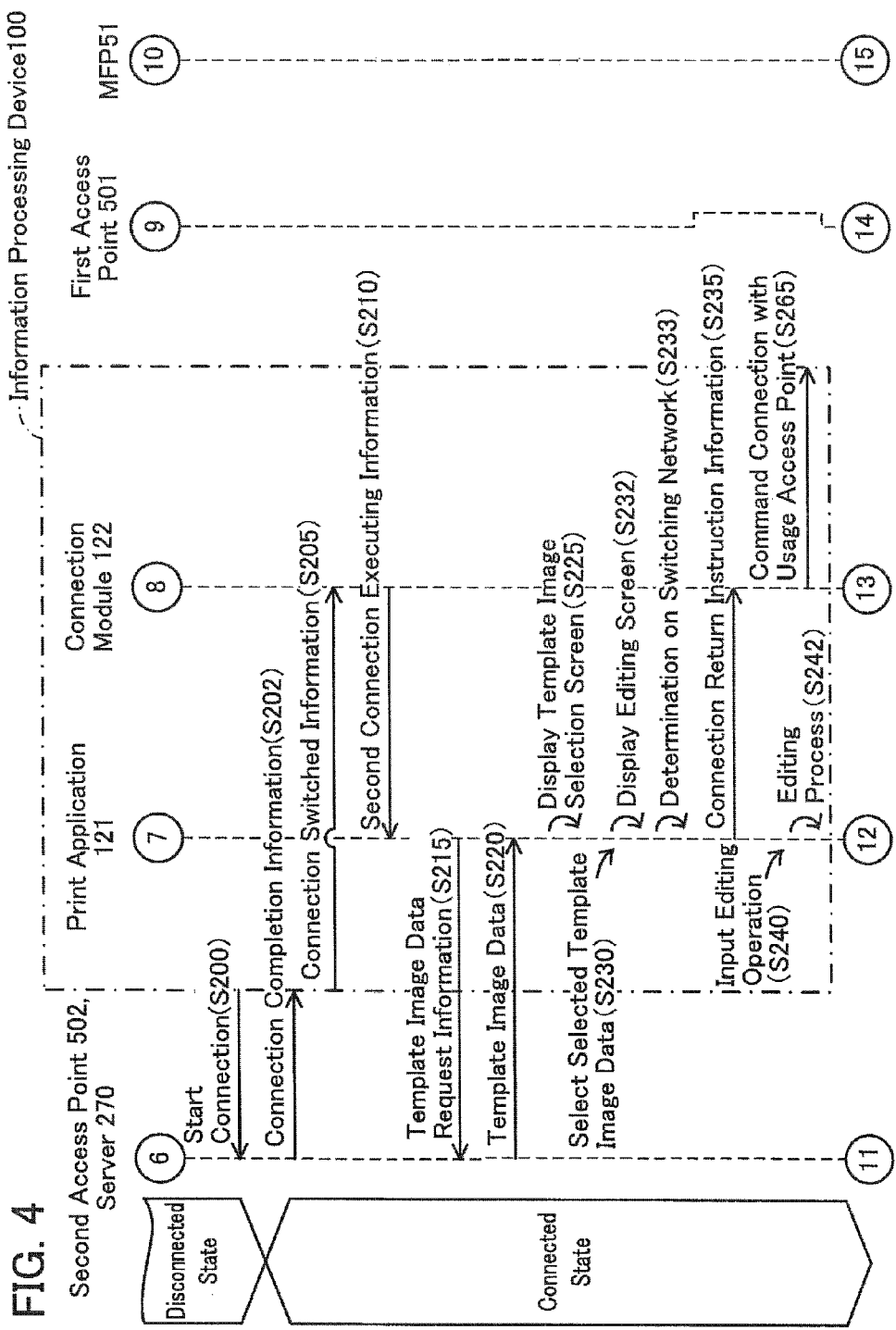
FIG. 4 shows an operation sequence view of the communication system.
Figure 5:
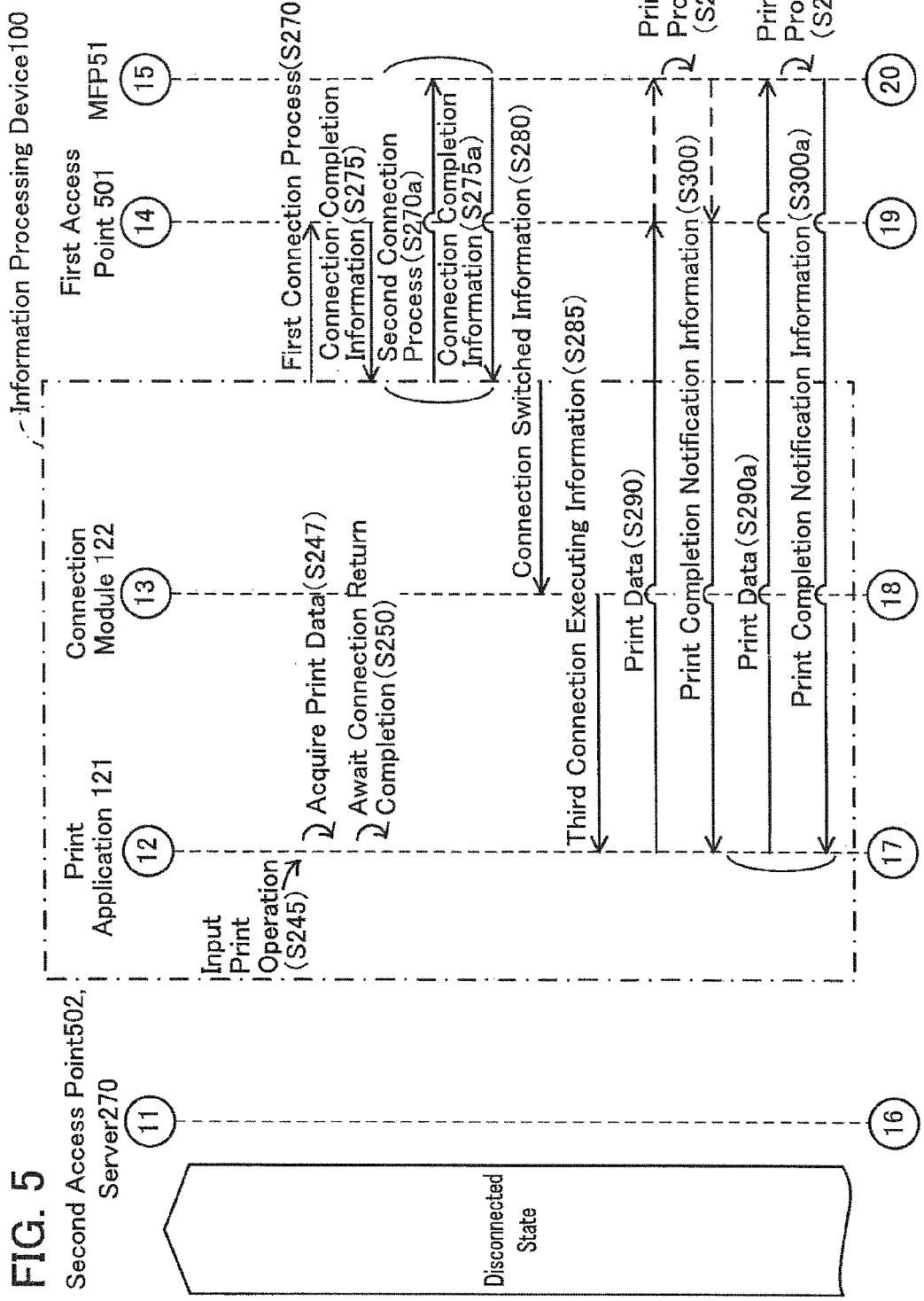
FIG. 5 shows an operation sequence view of the communication system.
Figure 6:
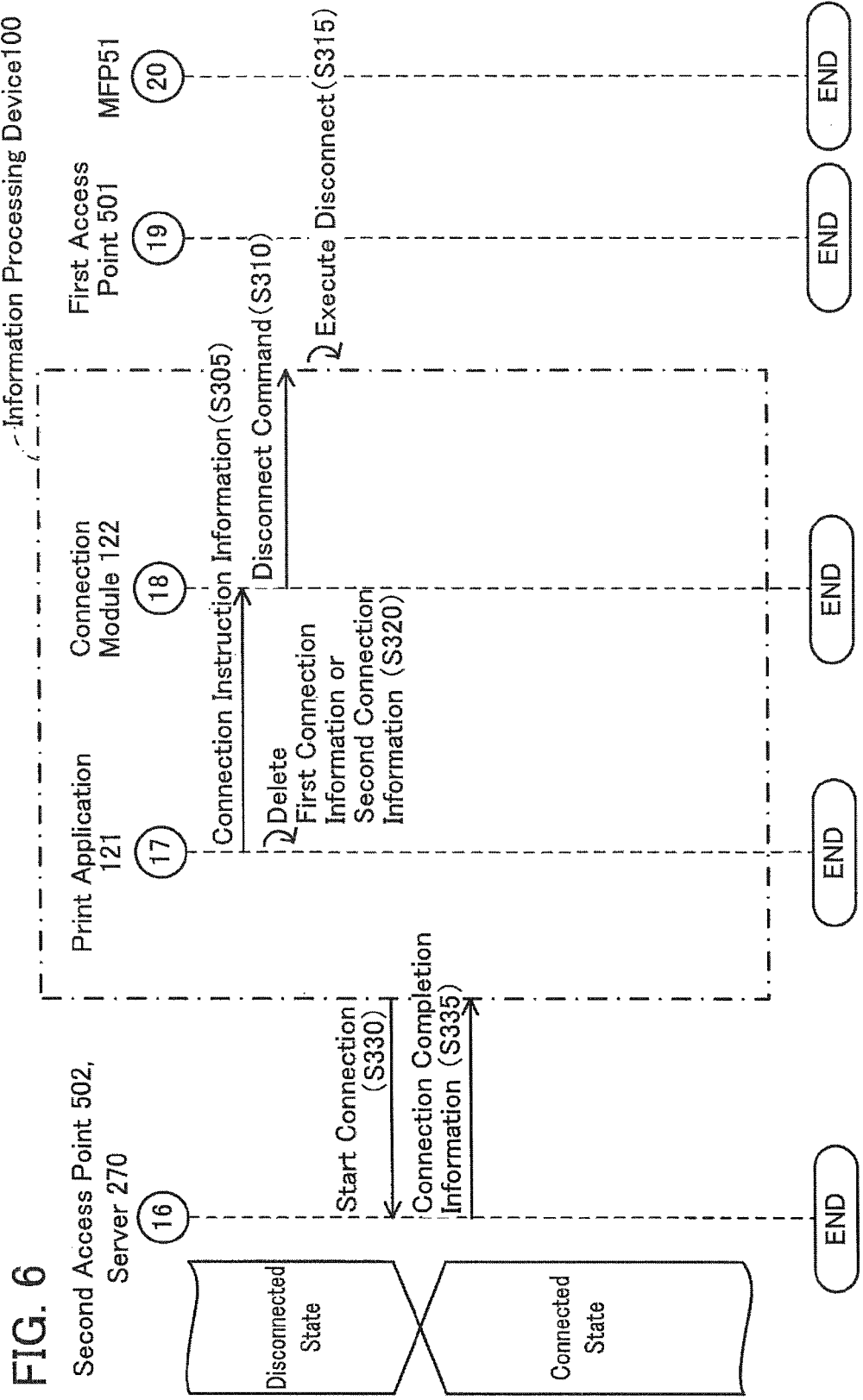
FIG. 6 shows an operation sequence view of the communication system.

As shown in FIG. 2, when the print application 121 is started by the information processing device 100, in S105 the print application 121 displays a main screen on the display means 102. Moreover, in the present embodiment, a case is shown in which the print application 121 was started in a state of the information processing device 100 being connected with the second access point 502. Region R1, which indicates a connected state, indicates that the information processing device 100 is in a state of being connected with the second access point 502. A command to start the print application 121 may be input from the touch panel 103 by the user. The data to be displayed by the main screen may be stored in advance in the storage unit 109. The application may display a screen by starting an activity.

Figure 7:
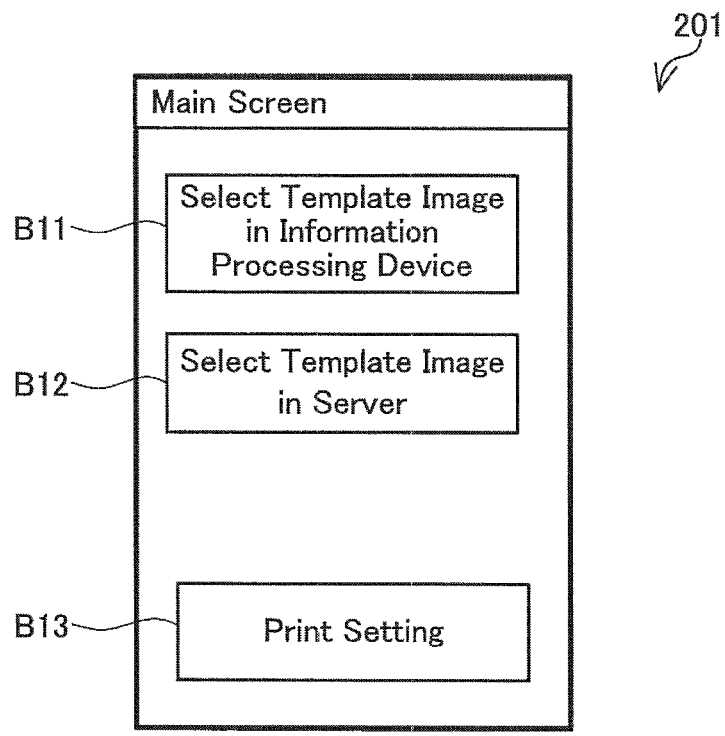
FIG. 7 shows a display example of a main screen.

An example of a main screen 201 is shown in FIG. 7. The main screen 201 includes button images B11 to B13. The button images B11 and B12 are respectively an image for accepting the input of a display instruction of a first image selection screen and a display instruction of a second image selection screen. The first image selection screen is a screen for accepting an operation to select a printing target image from among a plurality of images provided in advance by the print application 121. The second image selection screen is a screen for accepting an operation to select a template image of the printing target from among a plurality of template images stored in the storage unit 271 of the server 270. The button image B13 is an image for accepting input of an instruction to cause the display means 102 to display a setting screen.

In the present embodiment, an operation will be described of a case that the user causes the display means 102 to display a setting screen. In S110, the print application 121 accepts the input of a setting screen display instruction. The input acceptance of the setting screen display instruction may be performed by the touch panel 103 detecting a tapping operation of the button image B13 performed by the user.

In S115, the print application 121 sends setting screen display instruction information to the connection module 122. Communication between the print application 121 and the connection module 122 is performed via an intent. Specifically, from among the print application 121 and the connection module 122, the application being displayed in the foreground on the screen sets information in an intent, and calls the other application by using the API of the OS, whereupon the called application reads the information set in the intent, and displays a screen. The application may call the other application by using a shared function of the OS. In the subsequent description, also, communication between the print application 121 and the connection module 122 is performed via the intent even when there is no particular description relating to the intent.

In S120, the connection module 122 displays a setting screen. An example of a setting screen 202 is shown in FIG.

8. The setting screen 202 is a screen for accepting the selection of a printer to perform a print, and the selection of a network that mediates communication with the printer. Network images 213, 214, and 215, and device images 221, 231, and 241 are included in the setting screen 202.

The network image 213 is an image indicating a network with which the WF_I/F can communicate, and to which the information processing device 100 does not currently belong. The network image 213 is also an image indicating an SSID of the network to which the information processing device 100 does not currently belong. The device image 221 is an image indicating a printer belonging to the network indicated by the network image 213. The device image 221 includes a device name 222 and an IP address 223. The device name 222 is information for identifying the printer capable of communication. The IP address 223 is the IP address of the printer having the device name 222.

Figure 8:
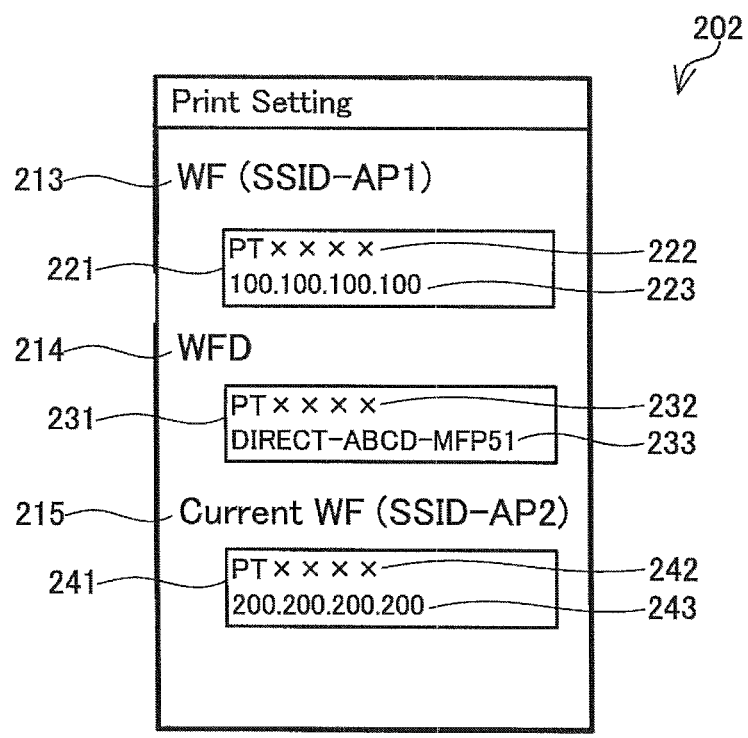
FIG. 8 shows a display example of a setting screen.

When a device has been selected as the sending destination of the print data, the print application 121 stores the device name and the IP address of the selected device in the storage unit 109 in association with the SSID of an access point of the network to which that device belongs, an encryption method, password, etc. The encryption method and password is information for performing data encryption, etc. in the wireless LAN. Together with the setting screen display instruction information, the print application 121 sends the SSID associated with the device name and the IP address stored in the storage unit 109 to the connection module 122. The connection module 122 displays the network image 213 and the device image 221 based on the information received from the print application 121. Moreover, in case information of a plurality of devices is received from the print application 121, the connection module 122 displays a plurality of the device images 221. In the example of FIG. 8, an image indicating the SSID of the first access point 501 is displayed as the network image 213, and an image indicating information of the MFP 51 is displayed as the device image 221.

The network image 214 is an image indicating a network with which the WFD_I/F can communicate, and is programmed in the connection module 122 in advance. The device image 231 is an image indicating a printer capable of communication by means of the WFD_I/F. The connection module 122 that has received the setting screen display instruction information collects the information of access points operating in the vicinity of an information processing device 100 via the OS 124 and the wireless LAN_I/F. The SSID of the access point, MAC address of the access point, node name of the access point, etc. is included in the information of the access point. The connection module 122: extracts, from among the collected information of the access points, the information of the printer that is functioning as a Group Owner and that the print application 121 can use as the sending destination of the print data; and displays only the extracted information as the device image 231. The device image 231 is also an image indicating the SSID of the printer that is functioning as Group Owner, and information for identifying the printer (e.g., MAC address or node name). In the example shown in FIG. 8, an image is displayed, as the device image 231, indicating the information of the MFP 51 that is functioning as the Group Owner.

The network image 215 is an image indicating a network: with which the WF_I/F is capable of communicating; and to which the information processing device 100 currently belongs. The network image 215 is also an image indicating the SSID of the network to which the information processing device 100 currently belongs. The connection module 122 which has received the setting screen display instruction information acquires, from the OS, the SSID of the network to which the information processing device 100 belongs. Further, the connection module 122 instructs the OS 124 to broadcast information, for requesting a reply of device name, IP address, etc. from the printer, to the network to which the information processing device 100 belongs. In response to the connection module 122 acquiring the replied information via the OS, the connection module 122 extracts information of the printer which the print application 121 can use as the sending destination of the print data from among the replied information, and displays only the extracted information as the device image 231. The device image 241 is an image indicating the printer belonging to the network indicated by the network image 215. In the example shown in FIG. 8, an image indicating the SSID of the second access point 502 is displayed as the network image 215, and an image indicating the information of the MFP 52, which is different from the MFP 51, is displayed as the device image 241.

In S123, the connection module 122 accepts operation input to select a printer to perform a print and a network that mediates communication with the printer. Acceptance of the operation input may be performed by touch panel 103 detecting a tapping operation by the user on any of the device images 221, 231, and 241.

In S125, the connection module 122 identifies a usage access point, which is the access point belonging to the network that mediates communication with the printer selected in S123. In the example shown in FIG. 8, in case tapping of the device image 221 was detected, the first access point 501 is identified as the usage access point. In case tapping of the device image 231 was detected, the MFP 51 is identified as the usage access point. In case tapping of the device image 241 was detected, the second access point 502 is identified as the usage access point.

Moreover, an encryption method and password input screen may be displayed on the display means 102 in the case that (i) the device image 231 was selected, and (ii) it was determined that the device image 221 is selected and the encryption method and password required to connect with the usage access point are not being stored. Then, the encryption method and password that are required to cause the information processing device 100 to belong to the network to which the usage access point belongs may be accepted.

Further, in the case that the device image 221 or the device image 231 was selected, the connection module 122 determines that it is necessary to switch the affiliation of the information processing device 100 to the network to which the usage access point belongs. If the device image 241 is selected, the connection module 122 determines that it is not necessary to switch the affiliation of the information processing device 100 to the network to which the usage access point belongs, because the information processing device 100 is originally belonging to the network to which the usage access point belongs. Moreover, the method of determining may be to compare the SSID of the usage access point and the SSID of the network to which the information processing device 100 belongs, and to determine, if the SSIDs do not match, that the affiliation of the information processing device 100 needs to be switched to the network to which the usage access point belongs.

In the illustrative example of the present embodiment, the case will be described in which it was determined in S125 that it is necessary to switch the affiliation of the information processing device 100 to the network to which the usage access point belongs. Therefore, in the sequence view, the case of switching a network is described. In S130, the connection module 122 stores return information in the storage unit 109. The return information is information needed to return the affiliation of the information processing device 100 to the network to which the information processing device 100 currently belongs at a later occasion. The return information is information indicating, e.g., SSID, encryption method, password, etc.

In S140, the connection module 122 gives the OS 124 a command to start a connection with the usage access point and a command to prevent connection with an access point other than the usage access point. The storage unit 109 stores information for connecting with: the access point to which the information processing device 100 currently belongs; the access point to which the information processing device 100 earlier belonged; and the access point present in the vicinity of the information processing device 100, which was detected by the information processing device 100. Each time information for connecting to the access point is acquired, the OS 124 may store, in the storage unit 109, the acquired information and information indicating connection status with the access point indicated by the acquired information associated with each other. The information for connecting to the access point may be acquired by detecting the access point present in the vicinity of the information processing device 100, or may be acquired by input from the user or input from an application. The OS 124 may update the information indicating the connection status with the access point each time the connection status with the access point changes. The command to prevent connection with an access point other than the usage access point is a command to prevent connection with an access point other than the usage access point by using the information stored in the storage unit 109. The command to the OS 124 is performed in a state where the information processing device 100 is not connected with the first network N1 to which the MFP 51 belongs.

Moreover, in the case that it is determined in S125 that it is not necessary to cause the information processing device 100 to belong to the network to which the usage access point belongs, the processes S140 to S162 may not be performed.

In case the usage access point is the first access point 501, in S145, the OS 124 executes a first connection process. The first connection process is a process for requesting, via the wireless LAN_I/F 105 in a method based on the WF scheme, a connection with the first access point 501. The connection with the first access point 501 is made by using first connection information. The first connection information includes the SSID, encryption method, password, etc. for connecting with the first access point 501. Moreover, when executing the first connection process, the OS 124 may store the first connection information in the storage unit 109. In S150, the OS 124 receives connection completion information from the first access point 501. The connection completion information is information indicating that the connection process succeeded. Moreover, after the affiliate network has been switched, the wireless LAN I/F 105 becomes able to send data which can be mediated by the network to which it is belonging, and becomes unable to send data which can be mediated by the network to which it belonged before switching. That is, the connection is disconnected with the network to which it belonged before switching.

On the other hand, in case the usage access point is the MFP 51, in S145a, the OS 124 executes a second connection process. The second connection process is a process to request, via the wireless LAN_I/F 105 in a method based on the WFD scheme, a connection with the MFP 51. The second connection process is performed by using second connection information. The second connection information includes the SSID, encryption method, password, etc. for connecting with the MFP 51. Moreover, when executing the second connection process, the OS 124 may store the second connection information in the storage unit 109. In S150a, the OS 124 receives connection completion information from the MFP 51. Moreover, in the sequence view, when various processes are executed using the wireless communication 155 of the WFD scheme, this is shown in parentheses. This indicates that either one of a communication using the wireless communication 151 of the infrastructure mode, and a communication using the wireless communication 155 of the WFD scheme can be used selectively.

In S155, the OS 124 notifies connection switched information to the connection module 122. The connection switched information is information indicating that the access point connected with the information processing device 100 has been switched. The connection module 122 that has received the connection switched information sends, via the OS 124 and the wireless LAN I/F 105, connection confirmation information to the printer corresponding to the image that was tapped, by using the IP address stored in correspondence with the image that was tapped. If reply information to the connection confirmation information was received from the printer, in S160 the connection module 122 sends first connection executing information to the print application 121. Further, if reply information was not received, the connection module 122 causes the display means 102 to display information indicating an error. Moreover, the processes of sending of the connection confirmation information, the sending of the reply information, and the error display, are not described in the sequence view.

The first connection information used in S145, or the second connection information used in S145a may be included in the first connection executing information. Further, the first connection executing information may be the first connection information itself, or may be the second connection information itself. The first connection executing information need not be sent as a single item of data. For example, data indicating completion of the connection process, and data indicating the connection information may be consecutively output separately.

In S162, the print application 121 stores the first connection information or the second connection information received in S160 in the storage unit 109.

In case the usage access point is the first access point 501, in S165 the print application 121 instructs the OS 124 to send printer information request information to the MFP 51 via the wireless communications 151 and 154. The printer information request information is information for requesting the printer information to be sent to the information processing device 100. The printer information is information indicating characteristics of the MFP 51. The printer information includes print media information, device status information, model name, and device name. The print media information is information indicating the type of print media (e.g., printing paper, tape) or size (e.g., paper size, tape width) that can be used. The device status information is information indicating the device status of the MFP 51. Examples of the information included in the device status information are the contents of an error occurring in the MFP 51, amount of ink remaining in the printer 19, amount of remaining tape, etc. The model name is information identifying the device type of the MFP 51. The device name is a name set at the time of manufacturing to uniquely identify the MFP 51, or is a name set by the user. In S170, the print application 121 receives the printer information from the MFP 51 via the wireless communications 151 and 154.

On the other hand, in case the usage access point is the MFP 51, in S165*a* the print application 121 instructs the OS 124 to send printer information request information to the MFP 51 via the wireless communication 155. In S170*a*, the print application 121 receives the printer information from the MFP 51 via the wireless communication 155. Further, in case the usage access point is the second access point 502, the print application 121 instructs the OS 124 to send printer information request information to the MFP 52 via the wireless communication 152. Then, the print application 121 receives the printer information from the MFP 52 via the wireless communications 158 and 152.

In S175, the print application 121 displays the main screen on the display means 102. The display contents of the main screen have already been described using S105 and FIG. 7, and consequently a description thereof is omitted here.

In the present embodiment, next, an operation will be described of the case that the user causes the second image selection screen to be displayed on the display means 102. In S180, the print application 121 accepts the input of a display instruction for the second image selection screen. The acceptance of the input of the display instruction for the second image selection screen may be performed by the touch panel 103 detecting a tapping operation by the user on the button image B12 (see FIG. 7). The acceptance of the input of the display instruction for the second image selection screen may be performed when the information processing device is connected with the first network. Further, the display instruction for the second image selection screen also functions as an acquisition instruction that instructs the acquisition of the template image data stored in the server 270.

In S182, the print application 121 determines whether it is necessary to switch the network to which the image processing device 100 belongs. This determination may be performed based on whether the first connection information or the second connection information is being stored in the storage unit 109. The case that the storage unit 109 is storing the first connection information or the second connection information is the case that the processes of S140 to S162 were executed. In the case that the storage unit 109 is not storing the first connection information or the second connection information, the processes of S185 to S210 do not need to be executed.

In the illustrative example of the present embodiment, the case will be described where it is determined in S182 that it is necessary to switch the network to which the image processing device 100 belongs (i.e., the case that it is determined that the first connection information or the second connection information is being stored in the storage unit 109). In this case, the print application 121 determines that it is necessary to switch the network to which the image processing device 100 belongs and, in S185, sends connection instruction information to the connection module 122. The connection instruction information is information instructing execution of the process to connect the information processing device 100 with the second network N2.

In S195, in case of being connected with the usage access point by the WFD scheme, the connection module 122 gives an instruction to the OS 124 of a disconnect command to disconnect the connection with the usage access point, and a return command to return the affiliation of the information processing device 100 using information for restoring the affiliation stored in the storage unit 109 in S140. On the other hand, in case of being connected with the usage access point by the WF scheme, an instruction is given to the OS 124 of a prohibiting command to prohibit connection with the usage access point, and a return command to return the affiliation of the information processing device 100.

In S197, the OS 124 inputs a disconnect instruction to the wireless LAN_I/F 105 in accordance with the disconnect command or the prohibiting command. Thereby, the wireless LAN_I/F 105 can no longer send data which can be mediated by the usage access point. That is, the connection with the usage access point is disconnected. Further, in accordance with the disconnect command, the OS 124 deletes information for connecting with the usage access point that was being stored in the storage unit 109.

In accordance with the return command, in S200 the OS 124 starts a connection with the second access point 502. Specifically, a connection instruction is input to the wireless LAN_I/F 105. Moreover, in S195, the connection module 122 does not need to give an explicit return command to the OS 124. In this case, in response to the disconnection in S197, the OS 124 may, in S200, switch the affiliation of the information processing device 100 to the network to which the information processing device 100 belonged directly prior to the switching of the affiliation of the information processing device 100 in S145 or S145*a*.

In S202, the OS 124 receives the connection completion information from the second access point 502. In S205, the OS 124 notifies the connection switched information to the connection module 122. The connection module 122 that has received the connection switched information sends the connection confirmation information to the server 270 via the OS 124 and the wireless LAN I/F 105 by using the address of the server 270. In case of receiving reply information to the connection confirmation information from the server 270, in S210 the connection module 122 sends second connection executing information to the print application 121. The address of the server 270 may be passed with the connection instruction information from the print application 121 to the connection module 122. In case of not receiving reply information to the connection confirmation information from the server 270, the connection module 122 displays error on the display means 102. Moreover, the processes of the sending of the connection confirmation information, the sending of the reply information, and the error display, are not described in the sequence view.

In S215, the print application 121 sends the template image data request information to the server 270 via the wireless communication 152. The template image data request information is information for requesting the server 270 to send the template image data to the information processing device 100.

In S220, the print application 121 receives a plurality of the template image data from the server 270 via the wireless communication 152. Template characteristics information may be included in each of the template image data. Examples of the template characteristics information is information indicating the type of print media (e.g., printing paper, tape) or size (e.g., paper size, tape width) that can be printed using the template image data.

In S225, the print application 121 extracts compatible template image data from among the plurality of template image data received in S220. The compatible template image data is template image data compatible with the printer information received from the MFP 51 in S170 or S170*a*, or with the characteristics indicated by the printer information received from the MFP 52. The extraction process of the compatible template image data may be executed, e.g., by comparing the template characteristics information included in each of the plurality of template image data, and the print media information included in the printer information. Thereby, e.g., in case the print media information indicates "tape", it is possible to extract, as the compatible template image data, only the template image data that is used for printing on a tape medium, and that is compatible with the characteristics of the print media of the printer.

Figure 9:
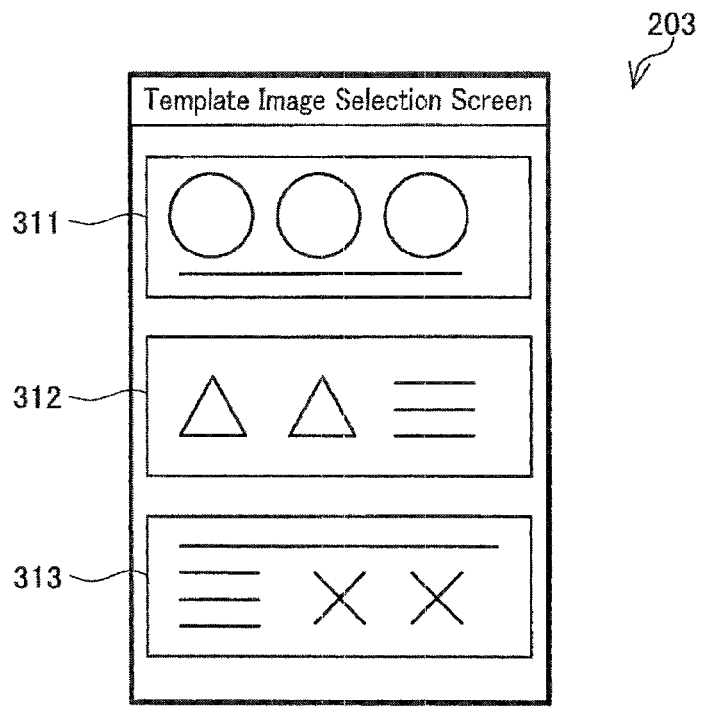
FIG. 9 shows a display example of a template image selection screen.

Further, in S225, the print application 121 displays a template image selection screen. An example of a template image selection screen 203 is shown in FIG. 9. Thumbnail images 311 to 313 are included in the template image selection screen 203. The thumbnail images 311 to 313 are reduced images of the images formed by each of the extracted plurality of compatible template image data.

In S230, the print application 121 accepts the input of an operation to select selected template image data to be the printing target. The acceptance of the input of the selection operation of the selected template image data may be performed by the touch panel 103 detecting a tapping operation by the user on the thumbnail images 311 to 313.

Figure 10:
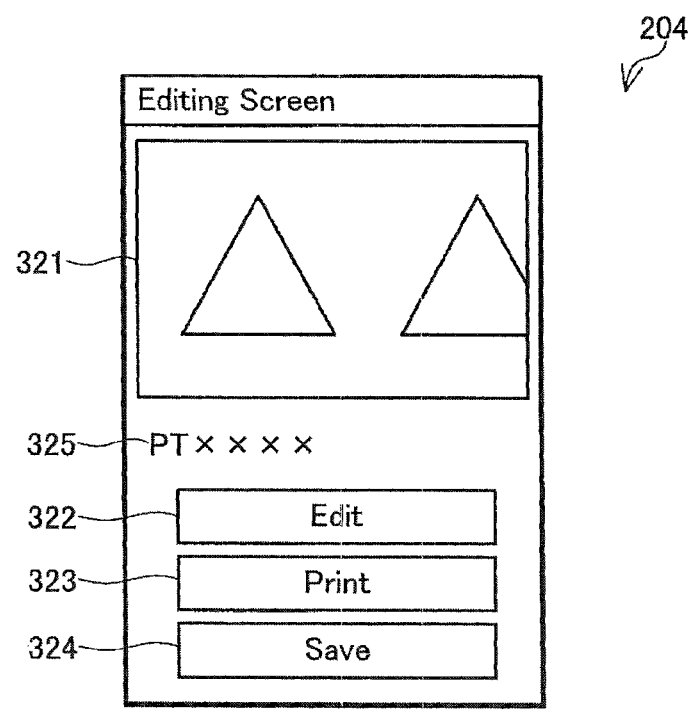
FIG. 10 shows a display example of an editing screen.

In S232, the print application 121 generates editing screen data for displaying an editing screen, and displays the editing screen on the display means 102. Moreover, the editing screen data may be data generated using consolidated information that is consolidated from the template image data and the printer information. An example of an editing screen 204 is shown in FIG. 10. The selected template image 321 is an image formed by the selected template image data. The selected template image 321 is displayed in a manner compatible with the characteristics indicated by the printer information received in S170. For example, in case the print media information included in the printer information indicates "tape", the selected template image 321 is displayed in a manner indicating a state of being printed on tape. When a tape width is 25 mm, the selected template image 321 may be displayed in a width corresponding to 25 mm, and when the tape width is 12 mm, the selected template image 321 may be displayed in a width corresponding to 12 mm, i.e., in a width narrower than the width corresponding to 25 mm.

An edit button image 322 is an image for accepting an execution start instruction of various editing processes on the selected template image 321. A print button image 323 is an image for accepting a print execution instruction of an image indicated by the selected template image 321. A save button image 324 is an image for accepting an instruction to store image data forming the selected template image 321 in the storage unit 109. A printer image 325 is an image based on the printer information received from the MFP 51 in S170 or S170a, or on the printer information received from the MFP 52, and is an image for displaying information for identifying a printer to perform a print (e.g., the device name, the IP address, the model name, appearance matching the model name).

In response to the creation of the editing screen data, in S233 the print application 121 determines whether it is necessary to switch the network to which the image processing device 100 belongs. The determination may be executed based on whether the first connection information or the second connection information is being stored in the storage unit 109.

In the illustrative example of the present embodiment, the case will be described in which it is determined in S233 that it is necessary to switch the network to which the image processing device 100 belongs (i.e., the case in which it is determined that the first connection information or the second connection information is being stored in the storage unit 109). In the case that it is determined that switching is necessary, in S235 the print application 121 sends connection return instruction information to the connection module 122. The connection return instruction information is information to instruct execution of a process to return the connection destination of the information processing device 100 to the usage access point. The first connection information or the second connection information stored in the storage unit in S162 may be included in the connection return instruction information. Further, the connection return instruction information may be the first connection information itself, or may be the second connection information itself The connection return instruction information need not be sent as a single item of data. For example, data indicating an instruction of the connection return, and data indicating the connection information may be consecutively output separately.

In response to the connection module 122 receiving the connection return instruction information from the print application 121 in S235, the process proceeds to S265. In S265, the connection module 122 gives an instruction, to the OS 124 in accordance with the connection return instruction information received in S235, to start the connection with the usage access point and to prevent a connection with an access point other than the usage access point.

In response to the connection return instruction information being sent to the connection module 122 in S235, in S240 the print application 121 accepts the input of an editing operation without waiting for the switching of the connection destination of the information processing device 100. For example, in response to the tapping of the edit button image 322 of FIG. 10 being detected, there may be a shift to an editing process screen (not shown) in order to execute various editing processes.

In S242, the print application 121 generates editing process screen data for displaying the editing process screen, and displays the editing process screen on the display means 102. Moreover, the editing process screen data may be data generated using consolidated information that is consolidated from the template image data and the printer information. The print application 121 determines the characteristics of the printer based on the model name, etc. included in the printer information, and generates the editing process screen data so as to display an edit button image for performing an edit corresponding to the characteristics. For example, if the printer is a color printer, a button image is displayed for performing a color change. Further, the print application 121 generates the editing process screen data so as to include an edit preview image in the editing process screen. The edit preview image is an image based on the template image data and the printer information. For example, the edit preview image has a width corresponding to the 25 mm width tape. The print application 121 executes various editing processes in accordance with a touch operation, or the like of buttons corresponding to the various editing processes. Examples of the various editing processes are image size change, color change, character string insertion, inversion of up, down, left and right, etc.

In S245, the print application 121 accepts input of the print operation. The input acceptance of print operation may be performed by a tapping operation on the print button image 323 of FIG. 10 being detected. In S247, the print application 121 acquires the print data. Specifically, based on the selected template image data, data for printing is acquired that corresponds to the characteristics of the printer. The data for printing may be data generated using consolidated information that is consolidated from the template image data and the printer information. Here, "acquires the print data" is a concept that includes converting the selected template image data directly into the data for printing, and converting the selected template image data into the data for printing after having executed various editing processes thereon (S242). "Converting the data for printing" may be restated as "generating the data for printing". "Acquiring the data for printing that corresponds to the characteristics of the printer" is a concept that includes acquiring data for printing that has a data format which can be interpreted by the printer.

In S250, the print application 121 waits for completion of the connection return to the MFP 51 instructed in S235. Specifically, the print application 121 waits to receive third connection executing information sent from the connection module 122 (S285). Moreover, if the third connection executing information is received before the acceptance of the input of the print operation, it is not necessary to wait in S250. That is, the processes of S265 to S285 may be executed in parallel with the processes of S240 to S247.

If the first connection information is included in the connection return instruction information, in S270, the OS 124 executes the first connection process, as in S140. In S275, the OS 124 receives the connection completion information from the first access point 501, as in S150.

On the other hand, if the second connection information is included in the connection return instruction information, in S270a the OS 124 executes the second connection process, as in S140a. In S275a, the OS 124 receives the connection completion information from the MFP 51, as in S150a.

In S280, the OS 124 notifies the connection switched information to the connection module 122, as in S155. In S285, the connection module 122 sends the third connection executing information to the print application 121. The third connection executing information is information indicating that execution of the connection process to the usage access point has been completed.

In response to receiving the notification of S285, the print application 121 recognizes that the connection for which it was waiting in S250 has been completed. Then, if the usage access point is the first access point 501, the process proceeds to S290.

In S290, the print application 121 sends the print data acquired in S247 to the MFP 51 via the wireless communications 151 and 154. In S295, the MFP 51 executes the print process using the received print data. In S300, the MFP 51 sends print completion notification information indicating that the print process has been completed to the print application 121 via the wireless communications 151 and 154.

On the other hand, if the usage access point is the MFP 51, the process proceeds to S290a. In S290a, the print application 121 sends the print data acquired in S247 to the MFP 51 via the wireless communication 155. In S295a, the MFP 51 executes the print process using the received print data. In S300a, the MFP 51 sends the print completion notification information indicating that the print process has been completed to the print application 121 via the wireless communication 155.

Further, if the usage access point is the second access point 502, the print application 121 sends the print data acquired in S247 to the MFP 52 via the wireless communication 152. The MFP 52 executes the print process using the received print data. Then, the MFP 52 sends the print completion notification information indicating that the print process has been completed to the print application 121 via the wireless communication 152.

In S305, the print application 121 sends the connection instruction information to the connection module 122, as in S185. In S310 to S315, the connection module 122 and the OS 124 execute the same processes as in S195 to S202. Thereby, the information processing device 100 can belong to the network to which the second access point 502 belongs, as before activation of the print application 121. If the first connection information or the second connection information is stored in the storage unit 109, the print application 121 deletes this information in S320 in response to the connection instruction information being sent to the connection module 122 in S305.

In S330, the OS 124 starts a connection with the second access point 502. In S335, the OS 124 receives the connection completion information from the second access point 502. Thereby, the communication system 10 returns to the initial state.

(Advantages)

According to the technique described in the present specification, the information processing device 100 can receive the printer information from the MFP via the first network N1 (S170), and can receive the template image data from the server 270 via the second network N2 (S220). Thus, based on the printer information and the template image data, it becomes possible for the information processing device 100 to generate the print data used by the MFP 51 (S247).

The information processing device 100 may be connectable only to either one of the first network N1 and the second network N2. That is, it may not be possible to simultaneously perform a communication with the MFP 51 and a communication with the server 270. In the technique described in the present specification, the connection destination of the information processing device 100 can be switched to the second network N2 (S265) in response the information processing device 100 being connected with the first network N1 and receiving the template image data from the server 270 (S220). Thereby, it becomes possible to prevent the situation from occurring in which, due to the connection process to the first network N1, the template image data cannot be acquired from the server 270 via the second network N2. Further, since the switching of the network can be executed automatically, the user does not need to perform an operation to switch the connection destination. Convenience to the user can be increased.

In the case that the information processing device 100 is connected with the first network N1 (S145, S145a), with the issuing of the command acquired in S180 as a trigger, the connection with the first network N1 can be disconnected (S197) and the connection with the second network N2 (S200) can be performed. Then, the connection with the first network N1 can be reestablished (S270, S270a) in response to the template image data being received from the server 270 (S220). Thereby, it becomes possible to realize the operation to return the connection with the first network N1 in the case that the connection with the first network N1 has been disconnected. Thus, it becomes possible to appropriately perform a communication with the server 270 and the MFP 51 even in a case that the connection with the first network N1 and the connection with the second network N2 cannot be performed simultaneously.

In the case that the connection destination of the information processing device 100 is the second network N2, if the need to receive printer information from the MFP 51 has occurred, the connection destination of the information processing device 100 can be switched to the first network N1 (S145, S145a). Then, in response to the reception of the printer information being completed (S170, S170a), the connection with the first network N1 can be disconnected (S197) in order to return the connection to the second network N2. Thereby, it becomes possible to set the second network N2 to be a default connection destination of the information processing device 100 (see FIG. 2, region R1) in the case that the connection with the first network N1 and the connection with the second network N2 cannot be performed simultaneously.

The editing screen 204 (see FIG. 10) including the selected template image 321 can be displayed on the display means 102 (S232). Further, various editing processes can be executed on the selected template image data (S242). Then, the data for printing can be acquired based on the selected template image data (S247). Thereby, it becomes possible to cause the MFP 51 to execute a print process using the edited selected template image data (S295).

Compatible template image data that is compatible with the characteristics indicated in the printer information received in S170 can be extracted (S225) from among the plurality of template image data received in S220. Then, the template image selection screen 203 (see FIG. 9) including a thumbnail of the image formed by the compatible template image data can be displayed on the display means 102 (S225). Thereby, it is possible to prevent the situation occurring in which print data incompatible with the MFP 51 is acquired.

The connection module 122 can execute a control to connect the information processing device 100 with the first network N1. Then, the first connection executing information can be sent to the print application 121 (S160) in response to the completion of the connection with the first network N1 (S140, S140a). Further, if the print application 121 requires the template image data (S185), the connection module 122 can execute a control to connect the information processing device 100 with the second network N2 (S200). Then, the second connection executing information can be sent to the print application 121 (S210) in response to the completion of the connection with the second network N2 (S202). Further, a control to connect the information processing device 100 with the first network N1 can be executed in response to the acquisition of the template image data (S220). Then, the third connection executing information can be sent to the print application 121 (S280) in response to the completion of the connection with the first network N1 (S270, S270a). Thereby, since the process of controlling the connection with the MFP 51 or the server 270 can be executed by the connection module 122, it becomes possible to simplify the functions of the print application 121.

The connection module 122 can send the first connection executing information including the connection information to the print application 121 (S160) in response to the completion of the connection of the information processing device 100 with the first network N1 (S140, S140a). Further, if the information processing device 100 is connected with the second network N2, the connection module 122 can execute a control to connect the information processing device 100 with the first network N1 (S265) in response to receiving the connection return instruction information from the print application 121 (S235). At this juncture, the connection module 122 can connect the information processing device 100 with the first network N1 (S265) using the connection information having the same contents as the connection information sent in S160, said connection information being included in the connection return instruction information. Thereby, it becomes possible to appropriately perform a communication with the server 270 and the MFP 51 by using the connection module 122.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

It may not be possible to connect the information processing device 100 with the second network N2 using the infrastructure mode wireless communication. For example, in the case that the second access point 502 does not exist or is faulty, in the case that the information processing device 100 is not provided with the wireless LAN_I/F 105, etc. Even in such cases, it is possible to connect the information processing device 100 with the second network N2 by using the wireless communication 157 that uses the mobile telephone I/F 114. Thereby, it is possible to provide redundancy in the communication system 10.

The information processing device 100 may not be able to acquire the template image data from the server 270 (S220) even though the connection with the second network N2 (S202) using the infrastructure mode wireless communication 152 was possible. For example, in the case that an abnormality has occurred in the communication path of the second access point 502 and the Internet 260, or the case that the communication path is busy. In this case, in response to being unable to acquire the template image data from the server 270, the connection path with the second network N2 may be switched automatically from the infrastructure mode wireless communication 152 to the wireless communication 157 based on the communication standard for mobile telephones. Thereby, since it is possible to switch and use a plurality of communication paths, it is possible to provide redundancy in the communication system 10.

The timing at which the connection return instruction information is sent from the print application 121 to the connection module 122 is not limited to the timing of S235. For example, the connection return instruction information may be sent at any timing between the timing of receiving the template image data from the server 270 (S220) to the timing of displaying the editing screen on the display means 102 (S232). For example, the connection return instruction information may be sent from the print application 121 to the connection module 122 in response to accepting the input of the operation to select the selected template image data in S230. By sending the connection return instruction information as early as possible from the timing of receiving the template image data from the server 270 (S220), the waiting period in S250 when waiting for the print application 121 to receive the connection completion information (S285) can be shortened. Further, e.g., the timing for sending the connection return instruction information may be speeded up in response to there being a long processing time for the first connection process (S270) or the second connection process (S270a). The processing time for the first connection process or the second connection process may be found by recording the connection history.

The connection return instruction information may be sent from the print application 121 to the connection module 122 in response to accepting the input of the print operation in S245. Because the connection return instruction information is information for establishing a path to send the print data to the MFP 51, the latest timing for sending the connection return instruction information is the timing of the input of the print operation in S245. Thereby, the period for which the information processing device 100 is connected with the first network N1 (S270 to S315) can be shortened. Power consumption in the MFP 51 may be greater in the case of the information processing device 100 using the WFD scheme wireless communication 155 than in the case of using the infrastructure mode wireless communication 151. Even in this case, since the period for which the information processing device 100 is connected with the first network N1 can be shortened, it is possible to reduce the power consumption in the MFP 51.

The MFP 51 may be a device driven by a battery. In this case, remaining battery level information indicating a remaining battery level of the MFP 51 may be included in the printer information received in S170. Then, the timing of sending the connection return instruction information from the print application 121 to the connection module 122 may be changed in response to the remaining battery level information. For example, if the remaining battery level indicated by the remaining battery level information is less than a predetermined value, the timing of sending the connection return instruction information may be made later than the timing when the remaining battery level is higher. As a specific example, if the remaining battery level is less than the predetermined value, the connection return instruction information may be sent in response to accepting the input of the print operation in S245. Further, if the remaining battery level is higher than the predetermined value, the connection return instruction information may be sent at any timing during the period from the time of receiving the template image data from the server 270 (S220) to the time of S245. Thereby, if the remaining battery level of the MFP 51 is low, the power consumption of the MFP 51 can be reduced by shortening the connection period of the information processing device 100 and the first network N1. Further, if the remaining battery level of the MFP 51 is high, it is possible to shorten the waiting period of the user by connecting with the first network N1 at an earlier stage than when the remaining battery level is low.

The template image data request information sent to the server 270 in S215 may be included in the printer information received in S170. Then, the extraction process for extracting the compatible template image data that is compatible with the characteristics indicated in the printer information may be executed in the server 270. In S220, the print application 121 may receive the extracted compatible template image data from the server 270. Thereby, it becomes possible to reduce the processing load of the information processing device 100, and to prevent the situation occurring in which print data incompatible with the MFP 51 is acquired.

In S155, the OS 124 may notify the first connection executing information to the connection module 122. Then, in S160, the connection module 122 may send the first connection executing information to the print application 121.

The editing process (S242) can be omitted. In this case, S240 and S242 may be omitted, and the process may proceed from S235 to S245. Thus, generally speaking, it is sufficient for the print device controlling program 123 to comprise at least the "(a) setting a communication", the "(b) receiving communication device information", the "(c) receiving an acquisition order", the "(d) setting a communication", the "(e) receiving external device information", and the "(f) acquiring usage data". As a specific example, it is sufficient for the print device controlling program 123 to execute at least S140, S170, S180, S200, S220, and S247.

Various devices may be used to supply the template image data to the MFP 51, and the device is not limited to the server 270. For example, a scanner may be used. In this case, scan data generated by the scanner may be used as the template image data.

The allocation of processes of the print application 121 and the connection module 122 described in the present embodiment is an example, and the processes may be allocated differently. For example, the template image data request information (S215), etc. may be output by the connection module 122.

Various communication schemes may be used in the communication scheme for connecting the information processing device 100 with the first network N1. For example, the bluetooth scheme wireless communication 156 may be used.

The contents of the display screens of FIG. 7 to FIG. 10 are an example, and the use of various display modes is possible. For example, in the setting screen 202 of FIG. 8, in case a plurality of printers to perform a print are present, more device images may be displayed in addition to the device images 221 and 231.

In the present embodiment, the description was given using the MFP 51 as an example of the "communication device" that communicates with the information processing device 100. However, the case is not limited to this configuration. The "communication device" may be a label printer, scanner, copier, portable terminal, PC, server, etc.

The information processing device 100 may have a configuration connectable with an external memory such as a memory card. Then, the configuration may be such that various data is stored in the external memory instead of the storage unit 109.

In the embodiment described above, the CPU 106 of the information processing device 100 realizes the processes of FIG. 2 to FIG. 6 by executing the program 120 (i.e., software) within the storage unit 109. Instead, at least one of the processes of FIG. 2 to FIG. 6 may be realized by hardware such as a logic circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A non-transitory computer-readable storage medium storing information processing program for an information processing device, the information processing device comprising:
a communication interface configured to perform communication with various networks, including a first network and a second network, communication with the first network and the second network not being performed simultaneously; and
a processor coupled to the communication interface,
the information processing program, when executed by the processor, causing the information processing device to perform:
(a) enabling a communication between the first network and the information processing device and preventing communication between the second communication network in a case that a setting to enable the communication between the first network and the information processing device is not being made,
  wherein the first network is configured to mediate a communication with a printer;
(b) receiving, from the printer via the first network and the communication interface, printer information after having enabled the communication between the first network and the information processing device, the printer information being information indicating characteristics of the printer;
(c) receiving an acquisition order to acquire template image data stored in an external device when the communication between the first network and the information processing device is enabled;
(d) automatically enabling a communication between the second network and the information processing device when the acquisition order is received in the process of (c) and disabling the communication between the first network and the information processing device,
  wherein the second network is configured to mediate a communication with the external device;
(e) receiving, from the external device via the second network and the communication interface, the template image data stored in the external device after having enabled the communication between the second network and the information processing device;
(f) acquiring print data to be used in the printer by using the printer information and the template image data, when the printer information is received in the process of (b) and template image data is received in the process of (e);
(g) performing a process to re-enable the first network to communicate with the information processing device, when the template image data is received in the process of (e) after the communication between the second network and the information processing device has been disabled; and
(h) sending the print data acquired in the process of (f) to the printer via the first network and the communication interface, after the communication between the first network and the information processing device has been enabled;
wherein
  the information processing program further causes the information processing device to perform (j) displaying, on a display of the information processing device, in a mode complying with the printer information, an image display screen for displaying an image represented by the template image data and for accepting various editing processes on the image,
  in the process of (f), the print data is acquired based on the template image data when an input of an instruction to acquire the print data is accepted by an operation unit of the information processing device after when the image display screen is displayed on the display of the information processing device in the process of (j);
  in the process of (e), a plurality of template image data is received,
  the printer information received in the process of (b) includes a device type of the printer, and
  in the process of (f), template image data compatible with the device type indicated by the printer information received in the process of (b) is acquired, from among the plurality of template image data received in the process of (e), as the print data.

2. The non-transitory computer-readable storage medium according to claim 1, wherein
  the printer information received in the process of (b) includes a device type of the printer, and
  the process of (e) includes:
    sending, when the printer information is received in the process of (b), the received printer information to the external device; and
    receiving, from the external device, template image data compatible with the device type included in the printer information, and
  the print data acquired in the process of (f) is the template image data, compatible with the device type, received in the process of (e).

3. The non-transitory computer-readable storage medium according to claim 1, wherein
  the information processing program includes:
    a connection control program, when executed by the processor, causing the information processing device to perform the processes of (a) and (d); and
    an information processing device control program, when executed by the processor, causing the information processing device to perform the processes of (b), (c), (e), and (f).

4. The non-transitory computer-readable storage medium according to claim 3, wherein
  in the process of (a), the process to enable the communication between the first network and the information processing device is performed by using connection information for enabling the communication between the information processing device and the first network, in the case that the communication between the first network and the information processing device is not enabled,
  the connection control program further causes the information processing device to perform (k) sending first connection executing information when the communication between the information processing device and the first network has been enabled in the process of (a),
  in the process of (b), the printer information is received when the first connection executing information is sent in the process of (k),
  in the process of (d), a process to enable the communication between the second network and the information processing device is performed when the acquisition order is received in the process of (c) after the printer information has been received in the process of (b),
  the connection control program further causes the information processing device to perform (l) sending second connection executing information when the process to enable the communication between the second network and the information processing device has been performed in the process of (d),
  in the process of (e), the template image data stored in the external device is received when the second connection executing information has been sent in the process of (l),
  the information processing device control program further causes the information processing device to perform (m) sending connection return instruction information when the template image data stored in the external device is received in the process of (e),
  the connection control program further causes the information processing device to perform:
    (n) performing a process to enable the communication between the first network and the information processing device when the connection return instruction information is sent in the process of (m); and
(o) sending third connection executing information when the process to enable the communication between the first network and the information processing device is performed in the process of (n), and
the information processing device control program further causes the information processing device to perform (p) sending print data acquired in the process of (f) to the printer via the first network and the communication interface when the third connection executing information is sent in the process of (o).

5. The non-transitory computer-readable storage medium according to claim 4, wherein
the information processing program includes:
the connection control program, and
a plurality of information processing device control program, which is configured to cause the information processing device to perform the process of (f) for accuiring the print data of different types, and
an acquiring method used in the process of (f) is different for each of the plurality of information processing device control program.

6. The non-transitory computer-readable storage medium according to claim 4, wherein
in the process of (k), the first connection executing information including the connection information is sent when the communication between the information processing device and the first network is enabled in the process of (a),
the information processing device control program further causes the information processing device to perform (r) storing, in a storage unit of the information processing device, the connection information included in the first connection executing information when the first connection executing information is sent in the process of (k),
the information processing device control program further causes the information processing device to perform (s) sending connection instruction information instructing to perform a process to enable the communication between the second network and the information processing device, when the acquisition order is received in the process of (c) after the printer information has been received in the process of (b),
in the process of (d), the process to enable the communication between the second network and the information processing device is performed when the connection instruction information is sent in the process of (s),
in the process of (m), the connection return instruction information including the connection information stored in the storage unit of the information processing device is sent when the template image data stored in the external device is received in the process of (e), and
in the process of (n), the process to enable the communication between the first network and the information processing device is performed by using the connection information included in the connection return instruction information, when the connection return instruction information is sent in the process of (m).

7. The non-transitory computer-readable storage medium according to claim 1, wherein
the communication interface includes:
a first communication interface for performing a wireless communication based on a wireless LAN standard; and
a second communication interface for performing a wireless communication based on a communication standard of a cellphone,
the communication with the first network is configured to be enabled:
by the information processing device not mediating through a mediation device, based on the wireless LAN standard performed by the first communication interface; or
by mediating through a first mediation device not connected with the internet, based on the wireless LAN standard performed by the first communication interface,
the communication with the second network is configured to be enabled:
by mediating through a second mediation device that connects with the internet, based on the wireless LAN standard performed by the first communication interface; or
by the information processing device based on the communication standard of the cellphone performed by the second communication interface.

8. The non-transitory computer-readable storage medium according to claim 7, wherein
the information processing program further causes the information processing device to perform (t) a process to enable the communication between the second network and the information processing device via the second communication interface, when the template image data cannot be received via the second network from the external device via the first communication interface in the process of (e).

9. The non-transitory computer-readable storage medium according to claim 1, wherein
the information processing program further causes the information processing device to perform (u) the process to enable the communication between the first network and the information processing device in a time period from when the template image data is received in the process of (e) to when the image display screen is displayed on the display in the process of (j).

10. The non-transitory computer-readable storage medium according to claim 1, wherein
the information processing program further causes the information processing device to perform (v) the process to enable the communication between the first network and the information processing device when an input of an instruction to display the image display screen on the display is accepted by the operation unit.

11. The non-transitory computer-readable storage medium according to claim 1, wherein
the information processing program further causes the information processing device to perform (w) the process to enable the communication between the first network and the information processing device when an instruction to generate the print data is accepted by the operation unit.

12. The non-transitory computer-readable storage medium according to claim 1, wherein
in the process of (b), the printer information including remaining battery level information indicating a remaining battery level of the printer is received,
the information processing program further causes the information processing device to perform:
(x) performing the process to enable the communication between the first network and the information processing device when an instruction to generate the print data is accepted by the operation unit, in a case that the remaining battery level indicated by the remaining battery level information is less than a predetermined value; and (y) performing the process to enable the communication between the first network and the information processing device at a timing after having received the template image data in the process of (e) and before when the instruction to generate the print data is accepted by the operation unit, in a case that the remaining battery level indicated by the remaining battery level information is greater than the predetermined value.

13. A non-transitory computer-readable storage medium storing information processing program for an information processing device, the information processing device comprising:
a communication interface configured to perform communication with various networks, including a first network and a second network, communication with the first network and the second network not being performed simultaneously; and
a processor coupled to the communication interface, the information processing program, when executed by the processor, causing the information processing device to perform:

(a) enabling a communication between the first network and the information processing device and preventing communication between the second communication network in a case that a setting to enable the communication between the first network and the information processing device is not being made,
wherein the first network is configured to mediate a communication with a printer;

(b) receiving, from the printer via the first network and the communication interface, printer information after having enabled the communication between the first network and the information processing device, the printer information being information indicating characteristics of the printer;

(c) receiving an acquisition order to acquire template image data stored in an external device when the communication between the first network and the information processing device is enabled;

(d) automatically enabling a communication between the second network and the information processing device when the acquisition order is received in the process of (c) and disabling the communication between the first network and the information processing device,
wherein the second network is configured to mediate a communication with the external device;

(e) receiving, from the external device via the second network and the communication interface, the template image data stored in the external device after having enabled the communication between the second network and the information processing device;

(f) acquiring print data to be used in the printer by using the printer information and the template image data, when the printer information is received in the process of (b) and template image data is received in the process of (e);

(g) performing a process to re-enable the first network to communicate with the information processing device, when the template image data is received in the process of (e) after the communication between the second network and the information processing device has been disabled; and (h) sending the print data acquired in the process of (f) to the printer via the first network and the communication interface, after the communication between the first network and the information processing device has been enabled, wherein, when the communication between the information processing device and the second network has been enabled, the process of (a) further includes:
disabling the communication between the information processing device and the second network; and
enabling the communication between the first network and the information processing device, and in the process of (d), the process to enable the communication between the second network and the information processing device is performed by inputting a disabling order to the communication interface when the acquisition order is received in the process of (c) in the case that the communication between the first network and the information processing device has been enabled, the disabling order being for disabling the communication with the first network;

in the process of (e), a plurality of template image data is received, the printer information received in the process of (b) includes a device type of the printer, and in the process of (f), template image data compatible with the device type indicated by the printer information received in the process of (b) is acquired, from among the plurality of template image data received in the process of (e), as the print data.

14. The non-transitory computer-readable storage medium according to claim 13, wherein
the printer information received in the process of (b) includes a device type of the printer, and
the process of (e) includes:
sending, when the printer information is received in the process of (b), the received printer information to the external device; and
receiving, from the external device, template image data compatible with the device type included in the printer information, and
the print data acquired in the process of (f) is the template image data, compatible with the device type, received in the process of (e).

15. The non-transitory computer-readable storage medium according to claim 13, wherein
the information processing program includes:
a connection control program, when executed by the processor, causing the information processing device to perform the processes of (a) and (d); and
an information processing device control program, when executed by the processor, causing the information processing device to perform the processes of (b), (c), (e), and (f).

16. The non-transitory computer-readable storage medium according to claim 15, wherein
in the process of (a), the process to enable the communication between the first network and the information processing device is performed by using connection information for enabling the communication between the information processing device and the first network, in the case that the communication between the first network and the information processing device is not enabled,
the connection control program further causes the information processing device to perform (k) sending first connection executing information when the communication between the information processing device and the first network has been enabled in the process of (a), in the process of (b), the printer information is received when the first connection executing information is sent in the process of (k), in the process of (d), a process to enable the communication between the second network and the information processing device is performed when the acquisition order is received in the process of (c) after the printer information has been received in the process of (b), the connection control program further causes the information processing device to perform (l) sending second connection executing information when the process to enable the communication between the second network and the information processing device has been performed in the process of (d), in the process of (e), the template image data stored in the external device is received when the second connection executing information has been sent in the process of (l), the information processing device control program further causes the information processing device to perform (m) sending connection return instruction information when the template image data stored in the external device is received in the process of (e), the connection control program further causes the information processing device to perform:
(n) performing a process to enable the communication between the first network and the information processing device when the connection return instruction information is sent in the process of (m); and
(o) sending third connection executing information when the process to enable the communication between the first network and the information processing device is performed in the process of (n), and the information processing device control program further causes the information processing device to perform (p) sending print data acquired in the process of (f) to the printer via the first network and the communication interface when the third connection executing information is sent in the process of (o).

17. The non-transitory computer-readable storage medium according to claim 16, wherein
the information processing program includes:
the connection control program, and
a plurality of information processing device control program, which is configured to cause the information processing device to perform the process of (f) for acquiring the print data of different types, and
an acquiring method used in the process of (f) is different for each of the plurality of information processing device control program.

18. The non-transitory computer-readable storage medium according to claim 16, wherein
in the process of (k), the first connection executing information including the connection information is sent when the communication between the information processing device and the first network is enabled in the process of (a),
the information processing device control program further causes the information processing device to perform (r) storing, in a storage unit of the information processing device, the connection information included in the first connection executing information when the first connection executing information is sent in the process of (k), the information processing device control program further causes the information processing device to perform (s) sending connection instruction information instructing to perform a process to enable the communication between the second network and the information processing device, when the acquisition order is received in the process of (c) after the printer information has been received in the process of (b), in the process of (d), the process to enable the communication between the second network and the information processing device is performed when the connection instruction information is sent in the process of (s), in the process of (m), the connection return instruction information including the connection information stored in the storage unit of the information processing device is sent when the template image data stored in the external device is received in the process of (e), and in the process of (n), the process to enable the communication between the first network and the information processing device is performed by using the connection information included in the connection return instruction information, when the connection return instruction information is sent in the process of (m).

19. The non-transitory computer-readable storage medium according to claim 13, wherein
the communication interface includes:
a first communication interface for performing a wireless communication based on a wireless LAN standard; and
a second communication interface for performing a wireless communication based on a communication standard of a cellphone,
the communication with the first network is configured to be enabled:
by the information processing device not mediating through a mediation device, based on the wireless LAN standard performed by the first communication interface; or
by mediating through a first mediation device not connected with the internet, based on the wireless LAN standard performed by the first communication interface,
the communication with the second network is configured to be enabled:
by mediating through a second mediation device that connects with the internet, based on the wireless LAN standard performed by the first communication interface; or
by the information processing device based on the communication standard of the cellphone performed by the second communication interface.

20. The non-transitory computer-readable storage medium according to claim 19, wherein
the information processing program further causes the information processing device to perform (t) a process to enable the communication between the second network and the information processing device via the second communication interface, when the template image data cannot be received via the second network from the external device via the first communication interface in the process of (e).

21. The non-transitory computer-readable storage medium according to claim 13, wherein
the information processing program further causes the information processing device to perform (j) displaying, on a display of the information processing device, in a mode complying with the printer information, an image display screen for displaying an image represented by the template image data and for accepting various editing processes on the image, and in the process of (f), the print data is acquired based on the template image data when an input of an instruction to acquire the print data is accepted by an operation unit of the information processing device after when the image display screen is displayed on the display of the information processing device in the process of (j); and perform (u) the process to enable the communication between the first network and the information processing device in a time period from when the template image data is received in the process of (e) to when the image display screen is displayed on the display in the process of (j).

22. The non-transitory computer-readable storage medium according to claim 13, wherein in the process of (e), a plurality of template image data is received, the printer information received in the process of (b) includes a device type of the printer, and in the process of (f), template image data compatible with the device type indicated by the printer information received in the process of (b) is acquired, from among the plurality of template image data received in the process of (e), as the print data; and perform (u) the process to enable the communication between the first network and the information processing device in a time period from when the template image data is received in the process of (e) to when the image display screen is displayed on the display in the process of (j).

23. The non-transitory computer-readable storage medium according to claim 13, wherein in the process of (b), the printer information including remaining battery level information indicating a remaining battery level of the printer is received, the information processing program further causes the information processing device to perform:

(x) performing the process to enable the communication between the first network and the information processing device when an instruction to generate the print data is accepted by the operation unit, in a case that the remaining battery level indicated by the remaining battery level information is less than a predetermined value; and (y) performing the process to enable the communication between the first network and the information processing device at a timing after having received the template image data in the process of (e) and before when the instruction to generate the print data is accepted by the operation unit, in a case that the remaining battery level indicated by the remaining battery level information is greater than the predetermined value.

\* \* \* \* \*